United States Patent [19]
Burke

[11] 3,834,243
[45] Sept. 10, 1974

[54] MECHANICAL POSITIONING DEVICE FOR PRECISELY DETERMINING A SERIES OF MECHANICAL LOCATIONS

[75] Inventor: Raymond William Burke, Anaheim, Calif.

[73] Assignee: Beckman Instruments, Inc., Fullerton, Calif.

[22] Filed: Feb. 28, 1973

[21] Appl. No.: 336,726

[52] U.S. Cl. .................................... 74/33, 74/436
[51] Int. Cl. ........................................... F16h 55/04
[58] Field of Search ................................ 74/33, 436

[56] References Cited
UNITED STATES PATENTS
3,655,020  4/1972  Van Slooten ...................... 74/436

*Primary Examiner*—Samuel Scott
*Assistant Examiner*—Wesley S. Ratliff, Jr.
*Attorney, Agent, or Firm*—R. J. Steinmeyer; J. G. Mesaros

[57] ABSTRACT

Apparatus for slidably positioning a sample tray biased in a first direction by restoring means, the sample tray being coupled to a rack member coacting with a small motor driven gear for driving the sample tray in a direction opposite to the first direction, the small gear being coupled to a large gear having a plurality of position determining protruding fingers engaging a pawl member. The pawl member is configured for limited pivotal movement about an axis, the pawl having a pocket configured in one end thereof for sequentially engaging the protuding fingers, while the other end of said pawl has a shoulder portion engaging a solenoid actuated stop lever for selectively determining the engagement of the pocket with a predetermined protruding finger. Mechanically coupled to the sample tray is a piston engaging a fixed cylinder, the sample tray being initially motor driven to the extreme limit of its first direction with the solenoid energized to permit pivoting of the pawl member, the sample tray then being precisely positioned in the opposite direction to one or more selected positions under action of selective energization of the stop lever, under the force of the restoring means, the speed of return being controlled by the piston and cylinder. Limit switches are provided for selective sequential control.

11 Claims, 2 Drawing Figures

MECHANICAL POSITIONING DEVICE FOR PRECISELY DETERMINING A SERIES OF MECHANICAL LOCATIONS

BACKGROUND OF THE INVENTION

The present invention relates to a precision mechanical positioning device and more particularly to a mechanical mechanism for precisely locating each of a multiplicity of samples for analysis in a radiant energy analyzer.

In the field of spectrophotometry, it has been the general practice to employ both manual and automatic methods to insert and remove the samples being analyzed.

Although manual methods have served the purpose, they have not proved entirely satisfactory under all conditions of service for the reasons that considerable difficulty has been experienced in obtaining qualified technical personnel, in obtaining more complete data and in freeing experienced personnel for more creative work.

One of the most critical problems confronting designers of automatic spectrophotometers has been the precision positioning of sample cells in the light beam of the instrument. Slight variations in the mechanical position of the sample cell may produce variations in light transmission which significantly affect the instrument indication thereby producing intolerable errors. Prior art mechanisms have utilized large precision cams or complex mechanisms to achieve this result. Furthermore, such mechanisms have employed motor driven controls during the period when instrument measurements are being taken, resulting in noise interference with the measurements being taken.

SUMMARY OF THE INVENTION

Accordingly, it is an object of the invention to provide a mechanical positioning device for precisely determining a series of mechanical locations.

Another object of the invention is to provide a mechanical positioning device utilizing a nonelectrical positioning force during the time period when measurements are being taken.

Another object of the invention is to provide a nonelectrical speed controlling means for regulating the speed of movement of the positioning device during the time period when measurements are being taken.

The foregoing and other objects of the invention are accomplished by providing a small motor driven gear coacting with a rack member coupled to a sample tray for driving the sample tray in a first direction. During the reverse direction movement of the sample tray, the sample tray is slidably positioned under control of a spring means restoring force, the sample tray also being coupled to a dash pot for controlling the reverse speed of the sample tray. Precise positioning of the sample tray during its reverse movement is accomplished by means of a large gear coacting with the small gear, the large gear having a plurality of position determining protruding fingers sequentially engaging the pocket of a pawl member coupled for limited pivotal movement about an axis. The pawl member has a shoulder portion along one end thereof opposite the pocket, the shoulder portion coacting with a selectively energized solenoid actuated stop lever for selectively determining the engagement of a selected protruding finger with the pocket for precisely determining the position of the sample tray in the reverse direction. Limit switches are provided for energization in response to solenoid actuation, as well as limit positions of the rack member.

Further objects, features and advantages of the invention will be better understood by reference to the following description and accompanying drawing:

DESCRIPTION OF THE PREFERRED EMBODIMENT

Figure 1:
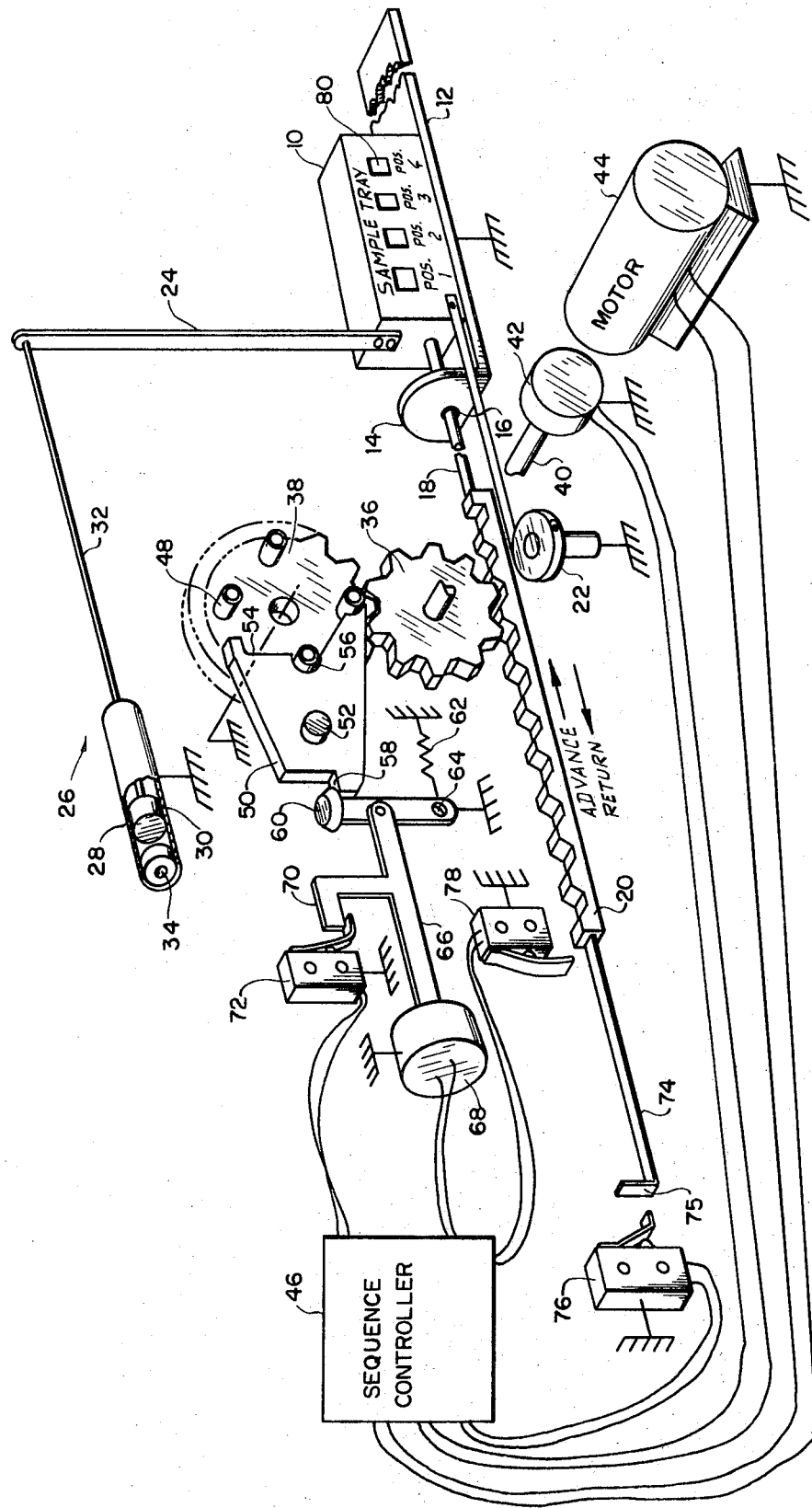
FIG. 1 illustrates a combination of a pictorial view and mechanical block diagram of a preferred embodiment of the invention.

Referring now to the drawing there is shown a sample tray 10 adapted for slidable movement with respect to a fixed frame member 12 having an angularly disposed portion 14 with an aperture 16 therein. Extending through aperture 16 is a rod member 18 having one end thereof coupled to the sample tray 10 while the other end thereof is coupled to a rack 20. The rack 20, the rod 18 and the sample tray 10 are slidably movable in an "advance" direction and a "return" direction as indicated by the arrows. The sample tray 10 is biased in the return direction by a suitable restoring force such as a negator spring 22. Further connected to the sample tray 10 is an elongated extension or rod 24 having the upper end thereof connected to a dash pot assembly generally designated 26. The dash pot assembly includes a cylinder 28 having a piston 30 slidably positioned therein, with the piston 30 being interconnected by means of rod 32 to the upper end of extension 24. The cylinder 28 is further provided with a vent 34 which is adjustable to control the damping effect of the dash pot assembly 26 when the sample tray 10 is moved in the return direction. The dash pot assembly 26 is constructed so that vent 34 opens when sample tray 10 is traveling in the advance direction to that piston 30 travels freely without damper effect.

The gear teeth of rack 20 matingly engage a small gear 36 which further rotates a large gear 38 coupled thereto. The small gear 36 is motor driven by shaft 40 through a clutch mechanism 42 by a motor 44. The clutch mechanism 42 and motor 44 are suitably electrically energized from a sequence controller 46.

The large gear 38 coacting with small motor driven gear 36 has extending from the surface thereof a plurality of perpendicularly disposed protruding fingers 48, which preferably include a plurality of rollers having the axes thereof secured to the side surface of the gear 38. Adjacent to and coacting with the protruding fingers 48 is a pawl member 50 secured for limited pivotal movement about its axis 52. The surface 54 of pawl member 52 coacting with the protruding fingers 48 includes a pocket 56, the surface 54 and pocket 56 being configured to permit movement of the fingers 48 adjacent the surface 54, the finger 48 resting in the pocket 56 when the pawl 50 is restrained from pivoting. The restraint imposed on pawl 50 is accomplished by means of a shoulder portion 58 formed in the portion of pawl 50 opposite the pocket 56 with the axis 52 being intermediate the two elements. Engaging the shoulder 58 is a stop lever 60 which is biased toward shoulder 58 by means of spring 62. The stop lever 60 is rotated about its lever axis 64 by means of a solenoid arm 66 actuated in response to the energization of solenoid 68. Stop 60 has limited pivotal movement about its axis 64 in response to the energization of solenoid 68 as well as the return of biasing force of spring 62. Solenoid arm 66 is provided with an upwardly extending inverted L-shaped bracket 70 which, upon energization of solenoid 68, activates switch 72 which has the leads thereof connected to the sequence control 46. Similarly, energization of solenoid 68 is effected through the sequence controller 46.

The rack 20 is provided with an axially extending rearwardly projecting limit rod 74 which is adapted to energize switch 76 at the extreme return position of rack 20, and to energize switch 78 at the extreme advance position of rack member 20, the switches 76 and 78 being coupled to the sequence control 46 for indicating limit positions.

The operation of the system will now be discussed. The sample tray 10 is provided with four apertures 80 having imprinted thereunder position 1, position 2, etc., (POS.1, etc.). The apertures 80 are provided to permit transmission of radiant energy therethrough with samples contained in each of the relative positions so that analytical measurements of the characteristics of the fluid sample can be made. In a radiant energy analyzer precise positioning is required for measurement, as previously discussed, and furthermore any potential for noise generation should be virtually eliminated in order to permit precise measurement. The operation of the mechanism of the present invention normally starts with position 1 on sample tray 10 being advanced to the right (as viewed in the drawing) until position 1 coincides with the position of the light beam and the finger on the limit rod 74 actuates switch 78. This is accomplished by means of sequence controller 46 issuing a command to energize clutch 42 and energize motor 44 to thereby drive gear 36 counterclockwise (as viewed in the drawing) while driving gear 38 clockwise. Simultaneously with the energization of the motor 44 solenoid 68 is energized to withdraw stop lever 60 from shoulder 58 of pawl 50 thereby permitting pawl 50 to oscillate freely as the protruding fingers 48 engage the surface 54 of pawl 50. At such time as the sample tray 10 is in its extreme advance position the finger of limit rod 74 actuates switch 78 issuing a command to the controller 46 indicating the limit of travel of sample tray 10, thereby de-energizing solenoid 68, permitting stop lever 60 to operate under the force of spring 62 to engage shoulder 58 of pawl 50 thereby locking a finger 48 in pocket 56, thereby determining the precise location of position 1. To move the sample tray 10 to position 2 for light beam passing therethrough, solenoid 68 is energized to withdraw stop lever 60 from engagement with shoulder 58, thereby permitting pawl 50 to rotate clockwise to free the roller or protruding finger 48 from pocket 56, with the force of negator spring 22 pulling the sample tray 10 in the return direction, at a speed determined by the opening 34 in the dash pot assembly 26. By this time the L-shaped bracket 70 on solenoid actuator arm 66 engages switch 72 to de-energize solenoid 68 thereby permitting stop lever 60 to rotate slightly clockwise under force of spring 62 to return the stop lever 60 to its position on shoulder 58. As negator spring 22 drives the sample tray 10 in the return direction small gear 36 which is now free wheeling (being disconnected from clutch 42) to rotate clockwise thereby driving large gear 38 counterclockwise until the next protruding finger 48 is resting within pocket 56, by which time the stop lever 60 is engaging shoulder 58.

This cycle is repeated for positions 3 and 4 until the finger of limit rod 74 engages switch 76, the actuation of which is sensed by the sequence control 46. Switch 76 serves as an override of switch 72 so that when the cycle is restarted, that is, when the sample tray is driven to its advanced position, switch 72 is de-activated so that solenoid 68 can remain energized during advance travel of tray 10, notwithstanding the engagement of switch 72 by the L-shaped bracket 70. With rack 20 in its advance position a singer of limit rod 74 engages switch 78 which thereby de-energizes solenoid 68 and resets the effectivity of switch 72 within the controller 46. As previously discussed with the rack 20 being driven to advance sample tray 10 the vent 34 on cylinder 28 is open to permit piston 30 to travel freely. Vent 34 has a controlled bleed to dampen the piston 30 when moving in the return direction.

Figure 2:
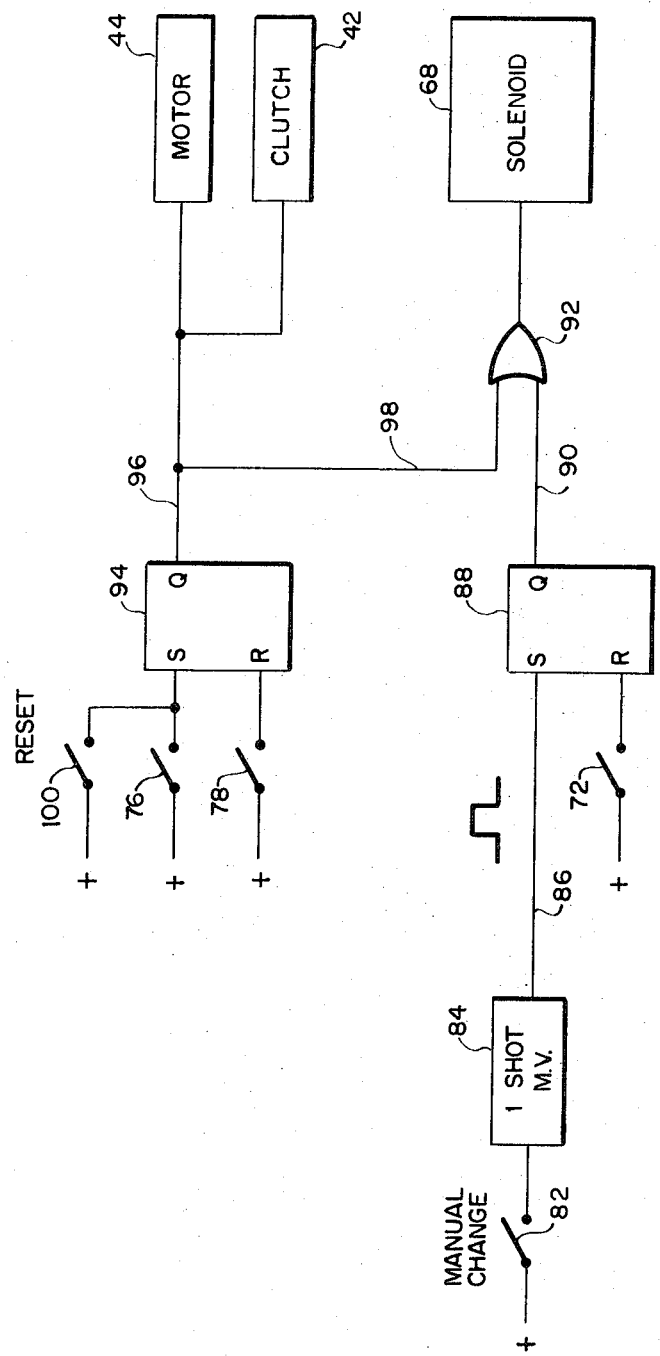
FIG. 2 illustrates an electrical circuit of the preferred embodiment.

Referring now to FIG. 2, there is shown a simplified schematic diagram of the electrical circuitry contained within the sequence controller 46. In this figure the schematic representation of switches 72, 76 and 78 are identified with the same numbers, while motor 44, clutch 42 and solenoid 68 are diagrammatically depicted by blocks, with each block being understood to contain a suitable switching device for applying power to the respective element in response to the logical inputs. For purposes of illustration the required voltage source is designated by a plus sign (+).

Regardless of the position of sample tray 10, to initiate a change of position a manual change switch 82 is depressed to connect the voltage source to a one-shot multivibrator 84 which generates a pulse output on lead 86 to the "set" input of flip-flop 88. The Q output appearing on line 90 goes "high" and is passed through OR gate 92 to thereby energize solenoid 68 thereby releasing pawl 50 as previously discussed to permit sample tray 10 to move in the return direction under the force of return spring 22. As previously discussed, when solenoid 68 is energized switch 72 is activated to thereby apply a signal to the "reset" input of flip-flop 88 thereby disabling solenoid 68. This occurs so long as sample tray 10 is not in position 4. As previously mentioned, when the sample tray is in position 4 the finger 75 of limit rod 74 is just short of switch 76. Consequently if the manual change switch is depressed with the sample tray in position 4, the sample tray returns an incremental amount until switch 76 is actuated thereby setting a second flip-flop 94, whose Q output goes "high" on lead 96 thereby energizing clutch 42 and motor 44 to drive the sample tray 10 in the advance direction. Simultaneously the output on lead 96 is transferred over lead 98 to the second input of OR gate 92 to energize solenoid 68, which thus remains energized during the time duration of energization of the clutch 42 and motor 44. As the tray 10 reaches the extreme advance position, the aperture 80 for position 1 of the sample tray has over-traveled the alignment of the radiant energy beam path, and finger 75 of limit rod 74 engages switch 78 thereby actuating the "reset" input of flip-flop 94, thereby de-energizing clutch 42, motor 44 and solenoid 68. The sample tray 10 is then drawn in the return direction under force of the return spring 22 until finger 48 of gear 38 engages pocket 56 of pawl 50, thereby defining the location of position 1 of the sample tray 10. In this position the finger 75 of limit rod 74 is out of engagement with switch 78.

If the sample tray 10 is not in position 4 and it is desired to drive sample tray 10 in the advance direction, a "reset" switch 100 is provided to enable the setting of flip-flop 94 to thereby energize clutch 42, motor 44 and solenoid 68. Ordinarily, however, successive depressions of manual change switch 82 is all that is required to increment the sample tray 10 from positions 1–4, with the next depression of switch 82 driving the sample tray 10 back to position 1. It is to be understood, however, that manual change switch 82 can be automatically activated by suitable timing means such as a timer controlled cam arrangement or by logical circuitry under timer control.

In accordance with the invention, the motor is energized during that period of time when no readings are being taken so that during the return travel of sample tray 10 as the various positions are being sequentially stepped through the light beam, the return movement is accomplished by nonelectrical means thereby eliminating the noise factor from the measurement cycle. Additionally while the large gear 38 is depicted as having four rollers or protruding fingers 48, with one finger corresponding to each position of sample tray 10, it is to be understood that by appropriate selection of the gearing ratios only one finger 48 need be used to accomplish the same precision positioning, with one complete rotation of gear 38 corresponding to one discrete positioning step of sample tray 10. Furthermore, since the sample movement from one position to another is accomplished by each roller 48 progressing to the single stop position in pocket 56 of pawl 50, with the move being discrete and always in the same direction, this eliminates over-travel or hysteresis which could cause positional errors. Furthermore by this means the motor 44 is actuated only once for each cycle of the sample tray 10 through the four positions indicated.

Also by logical sequencing within sequence controller 46, the position steps can be varied from position 1 to any one or more of the subsequent positions and need not include all four positions in sequence.

While there has been shown and described a preferred embodiment, it is to be understood that various other adaptations and modifications may be made within the spirit and scope of the invention.

I claim:

1. A mechanical positioning apparatus for determining a plurality of precise mechanical positions comprising:
   a frame;
   a body member movably positioned on said frame, said body member including a rack member;
   gear means coacting with said rack member, said gear means including a rotating member having at least one protruding finger;
   a pawl member secured to said frame for limited pivotal movement about an axis, said pawl member having a pocket formed therein for intermittently engaging said protruding finger;
   stop means selectively engaging said pawl member to restrain pivoting thereof;
   means for biasing said body member in a first direction;
   drive means selectively coupled to said gear means for driving said rack member in a second direction opposite to said first direction; and
   control means for selectively and sequentially actuating said drive means and said stop means for fixedly engaging said protruding finger in the pocket of said pawl member at a predetermined position of said body member.

2. The combination according to claim 1 wherein said gear means includes a small gear engaging said rack member and a large gear coacting with said small gear, said large gear being said rotating member.

3. The combination according to claim 2 wherein said large gear has a plurality of equiangularly positioned protruding fingers, each protruding finger defining a different predetermined position.

4. The combination according to claim 3 wherein said pawl member has a shoulder portion, said stop means includes a solenoid actuated stop lever selectively engaging said shoulder portion.

5. The combination according to claim 4 wherein said control means includes switch means operable in response to the movement of said stop lever for de-energizing said solenoid means.

6. The combination according to claim 5 wherein said control means includes first and second limit switch means actuable in response to the limit positions of said rack member in said first and second directions respectively.

7. The combination according to claim 1 wherein said control means selectively disengages said stop means and energizes said drive means for driving said rack member in said second direction, said control means includes limit switch means actuable in response to the limit of movement of said rack member in said second direction, said switch means de-energizing said drive means and engaging said stop means, said stop means thereafter being selectively actuated for permitting said body member to travel in said first direction under control of said biasing means for positioning said body member at predetermined locations along the path of travel of said body member in said first direction.

8. The combination according to claim 7 wherein said control means further includes other limit switch means actuable in response to the limit of travel of said rack member in said first direction for disengaging said stop means and energizing said drive means to drive said body member in said second direction to its limit.

9. In a radiant energy analyzer, a mechanical mechanism for precisely locating each of a multiplicity of samples in a position for analysis, comprising:
   a frame;
   a sample tray into which a multiplicity of samples are inserted for analysis, said sample tray being movably positioned on said frame;
   a rack member having means connecting said sample tray thereto;
   gear means coacting with said rack member, said gear means including a rotating member having at least one protruding finger;
   a pawl member secured to said frame for limited pivotal movement about an axis, said pawl member having a pocket formed therein for intermittingly engaging said protruding finger;

stop means selectively engaging said pawl member to restrain pivoting thereof;

means for biasing said sample tray in a first direction;

drive means selectively coupled to said gear means for driving said rack member in a second direction opposite to said first direction; and control means for selectively and sequentially actuating said drive means and said stop means for fixedly engaging said protruding finger in the pocket of said pawl member at a predetermined position of said sample tray.

10. The combination according to claim 8 wherein said control means selectively disengages said stop means and energizes said drive means for driving said rack member in said second direction, said control means includes limit switch means actuable in response to the limit of movement of said rack member in said second direction, said switch means de-energizing said drive means and engaging said stop means, said stop means thereafter being selectively actuated for permitting said sample tray to travel in said first direction under control of said biasing means for positioning said sample tray at predetermined locations along the path of travel of said rack member in said first direction.

11. The combination according to claim 10 wherein said control means further includes other limit switch means actuable in response to the limit of travel of said rack member in said first direction for disengaging said stop means and energizing said drive means to drive said sample tray in said second direction to its limit.

* * * * *